(12) United States Patent
Vehmas et al.

(10) Patent No.: US 12,450,616 B2
(45) Date of Patent: Oct. 21, 2025

(54) PERSONALIZED HEATING TRANSACTIONS IN PUBLIC SPACES

(71) Applicant: The Warming Surfaces Company Oy, Oulu (FI)

(72) Inventors: Jarno Vehmas, Rovaniemi (FI); Jani-Mikael Kuusisto, Tampere (FI); Terho Kololuoma, Oulu (FI)

(73) Assignee: The Warming Surfaces Company Oy, Oulu (FI)

( * ) Notice: Subject to any disclaimer, the term of this patent is extended or adjusted under 35 U.S.C. 154(b) by 24 days.

(21) Appl. No.: 18/464,310

(22) Filed: Sep. 11, 2023

(65) Prior Publication Data

US 2025/0086646 A1    Mar. 13, 2025

(51) Int. Cl.
*G06Q 20/42* (2012.01)
*G06Q 20/32* (2012.01)
*G06Q 50/06* (2012.01)

(52) U.S. Cl.
CPC ......... *G06Q 20/42* (2013.01); *G06Q 20/3224* (2013.01); *G06Q 20/3276* (2013.01); *G06Q 20/3278* (2013.01); *G06Q 50/06* (2013.01)

(58) Field of Classification Search
None
See application file for complete search history.

(56) References Cited

U.S. PATENT DOCUMENTS

2012/0061049 A1* 3/2012 Micucci ............... F24F 13/0604
165/59
2012/0296479 A1* 11/2012 Millar ................... F24H 15/262
700/277
2013/0159030 A1   6/2013 Tattenbaum et al.
2013/0259456 A1* 10/2013 Viswanathan ......... B25J 9/1697
392/407
2015/0255982 A1*  9/2015 Sasaki ..................... H02J 3/381
307/31

(Continued)

FOREIGN PATENT DOCUMENTS

WO    2016007961 A1    1/2016
WO    2023126373 A1    7/2023

OTHER PUBLICATIONS

Front Seat Heating, BMW UK; https://www.bmw.co.uk/en/shop/ls/dp/Seat_Heating_SFA_gb; accessed Aug. 31, 2023 (4 pages).

(Continued)

*Primary Examiner* — William J Jacob
(74) *Attorney, Agent, or Firm* — Carter, DeLuca & Farrell LLP

(57) ABSTRACT

The present invention relates to methods, system and computer program products for providing heat by a heatable object available for use by a user who is a member of the public. A heating transaction is requested by a user using a user device. The heating transaction may involve a commercial transaction involving a payment. In response to a successful performance of a commercial transaction or in response to receiving the request from the user device for the heating transaction, heating determined by the heating transaction is enabled for a determined period by one or more resistive heater elements integrated in the heatable object, and heating is commenced. Heating operation may be controlled by means of the user device.

16 Claims, 3 Drawing Sheets

(56) References Cited

U.S. PATENT DOCUMENTS

| | | | |
|---|---|---|---|
| 2017/0210216 A1* | 7/2017 | Yakubu | ................ H05B 1/0236 |
| 2021/0323449 A1 | 10/2021 | Mill et al. | |
| 2022/0026027 A1* | 1/2022 | Sanchez | ................ F26B 23/04 |
| 2022/0175145 A1 | 6/2022 | Pomeroy et al. | |
| 2022/0327609 A1* | 10/2022 | Barden | ................ H04W 4/30 |

OTHER PUBLICATIONS

International Search Report for Application No. PCT/FI2024/050453 dated Oct. 7, 2024, 6 pages.

\* cited by examiner

PERSONALIZED HEATING TRANSACTIONS IN PUBLIC SPACES

FIELD

The present invention relates to methods, a system and computer program products related to personalized heat transactions in public spaces. More particularly, the present enables a member of the public to request a heat transaction based on which activation of one or more heater elements integrated into an object available to the public is enabled for a predetermined period.

BACKGROUND

Many public venues provide seats for spectators or users. Seats may be equipped with a layer of insulating material that provides comfort to the user. Alternatively, a user may carry his/her own sheet of insulating material to increase comfort of sitting in the seat.

In some public venues and public spaces, seats are equipped with heater elements, which may be switched on and off using a mechanical switch provided at the seat itself. This solution has the problem that heater elements may be adversely left on when the user leaves, which causes waste of energy. The operator of the space may have limited or no real time visibility or control on the amount of heating consumed in aggregate at any given time in the venue or space. Energy to use for heating may be limited so that heater elements on all seats cannot be used simultaneously, but the entire system may become overloaded or number of seats to be heated may be limited on "first come, first served" basis.

DESCRIPTION OF THE RELATED ART

In some markets, such as United Kingdom, BMW® has announced that seat heaters of its cars are functional only though a separately purchased monthly or yearly subscription. See for example https://www.bmw.co.uk/en/shop/ls/dp/Seat_Heating_SFA_gb A piece of software blocks use of the feature unless removed via paying a license fee for a subscription. In this business model, cars with such subscribed features are associated with an account of the owner, which enables the subscription model to be applied. However, this subscription system cannot be used by the public.

Heating elements of an object according to the invention may be implemented using resistive heater elements such as heater pixels disclosed in U.S. patent application Ser. No. 18/194,626. Such electrically activated resistive heater elements can be embedded in surfaces of the object and heater elements provide quickly a comfortable microclimate to a person on the object.

SUMMARY

An object is to provide a method and apparatus so as to solve the problem of controlling individual objects providing warmth to any user's needs in public venues or public spaces.

The preferred embodiments of the invention are disclosed in the dependent claims.

The present invention is based on the idea of providing in an object for sitting, laying, kneeling, or standing available for public one or more individually controllable heater elements that can provide warmth to a user's specific needs and wishes when specifically activated with a control apparatus as result of a commercial or non-commercial transaction. The heater apparatus comprises a heater element integrated into an individually identifiable object in the public venue or public space and a manually and/or remotely controllable actuator, for example a remotely controllable, electrically operated actuator that opens and closes a switch. According to some embodiments, the actuator is an electromechanical switch, such as a relay. The remotely controllable actuator may also be implemented as a fully electrical solution without moving parts, for example using one or more transistors. A user interface is preferably available in a user device of the user that is in communication with the control apparatus, that is operable to select settings for the heating transaction upon requesting the heating transaction and/or during heating determined by the heating transaction. At least one safety switch may be used to manually switch on and off the one or more heater elements provided in the object. The one or more heater elements of the object can be turned on or off using the user interface and/or the manually operable safety switch. Local temperature level produced by the one or more heater elements may further be controlled either manually or by means of the user interface according to user preferences. According to some embodiments, activation of the heater element can be controlled by means of the user interface provided in the user device after the heating transaction has been successfully performed, and temperature level is manually adjustable, for example using an adjustment knob or button(s) provided at the object. Activation of heating by means of the control apparatus can be obtained by performing a commercial or non-commercial transaction using a transaction system associated with the control apparatus. According to some embodiments, the heating transaction is determined as being successfully performed in response to receiving, by the control apparatus, a request for the heating transaction that includes all required information, such as one or more identifiers of the object and/or heater elements, identification of the user device, and a period for which heating is requested. Optionally, the request for the heating transaction may require authorization of the user device for example by registering the user device to the heating service. After the transaction has been successfully performed, the control apparatus can activate appropriate functions to enable controlling one or more heater elements to be turned on for producing heat as determined by the heating transaction.

Use case examples for individually identifiable objects with heater elements are stadium seats, waiting room seats and benches, park benches and tables, bus stops and train or bus seats or any other surfaces in proximity of a person that can be individually heated via activation of the heater element.

According to some embodiments, a method of providing heat by an object available for use by a user who is a member of public is provided. The method performed by a control apparatus comprises i) receiving from a user device a request for a heating transaction concerning heating to be performed by one or more heater elements integrated into the object, wherein the request comprises at least a first identifier of the object; ii) optionally, determining a price for the heating transaction and initiating a commercial transaction; iii) upon receiving confirmation of a successful performance of the commercial transaction or, if there is no price set to the heating transaction, in response to receiving the request for the heating transaction, confirming to the user device a successful heating transaction that enables heating determined by the heating transaction for a determined period by the one or more heater elements; and iv) commencing the heating determined by the heating transaction.

According to some embodiments, the method further comprises: a) requesting the user to provide a second identifier of the object by means of a user device, b) receiving the second identifier from the user device, c) comparing the second identifier to the first identifier, and d) if the second identifier and the first identifier are determined to refer to the same object, enabling commencing the heating determined by the heating transaction by at least one heater element integrated into the object.

According to some embodiments the method further comprises: e) receiving, by means of a user interface provided by the user device, at least one setting concerning the heating transaction, wherein the at least one setting is selected from a group comprising: duration of heating, heating power, target temperature, activation of heating, deactivation of heating, and f) controlling heating determined by the heating transaction based on said at least one setting.

According to some embodiments, the method further comprises controlling, by the control apparatus, operation of a plurality of heater elements enabled by a plurality of heating transactions to maintain instantaneous total power consumption by said plurality of heater elements below a predetermined limit value.

According to some embodiments, a method for providing heat by an object available for use by a user who is a member of public is provided. The method performed by a user device comprises: i) obtaining, by a user device, a first identifier of the object; ii) sending, from the user device, a request for a heating transaction concerning heating to be performed by one or more heater elements integrated into the identified object, wherein the request comprises at least the first identifier of the object; iii) if the heating transaction is associated with a price, performing a commercial transaction with help of the user device; and iv) upon confirmation of a successful performance of the commercial transaction or, if there is no price set to the heating transaction, in response to sending the request for the heating transaction, receiving confirmation that commencing heating determined by the heating transaction is enabled for a determined period.

According to some embodiments, the method performed by the user device further comprises: a) receiving a request for providing a second identifier of the object, b) obtaining the second identifier by the user device, wherein the second identifier is provided at the object, c) sending, from the user device, the second identifier for comparing the second identifier to the first identifier, and d) in response to sending the second identifier, receiving confirmation that commencing heating determined by the heating transaction is enabled for a determined period, if the second identifier and the first identifier can be determined to refer to the same object.

According to some embodiments, the first identifier and/or the second identifier of the object are obtained by the user device by one or more of: 1) obtaining the first identifier or the second identifier using a code reader comprised or operationally coupled with the user device, when the identifier is provided as an optically detectable tag, such as a bar code or a QR-code, and/or 2) obtaining the first identifier or the second identifier using an electronic tag reader comprised or operationally coupled with the user device, wherein the first identifier or the second identifier is provided as an electronically readable tag, such as an NFC-tag, or an RFID-tag, and/or 3) receiving the first identifier or the second identifier as a string of characters typed in by the user in a user interface provided at the user device, wherein the first identifier or the second identifier is provided as a visually readable code provided on the object, and/or, 4) obtaining geographic location of the user device, wherein the first identifier or the second identifier is determined on basis of selecting from a plurality of objects an object that is within a predetermined distance from the geographic location of the user device, and/or 5) receiving the first identifier from a seat reservation system, wherein the first identifier identifies a seat reserved by the user.

According to some embodiments, the method performed by the user device further comprises determining, by means of a user interface provided at the user device, at least one setting concerning the heating transaction, wherein the at least one setting is selected from a group comprising: duration of heating, heating power, target temperature, activation of heating, deactivation of heating.

According to some embodiments, said determining is performed upon requesting the heat transaction and/or upon commencing the heating determined by the heating transaction and/or during the ongoing heating determined by the heating transaction.

According to some embodiments, a system for providing heat by an object available for use by a user who is a member of public is provided. The system comprises: i) a plurality of objects, each object comprising at least one heater element integrated into the object and at least one identifier, ii) a plurality of remotely controllable actuators, wherein each remotely controllable actuator is configured to control provision of operation power to the respective at least one heater element integrated into the respective object, and iii) a control apparatus configured to control the plurality of remotely controllable actuators, wherein the control apparatus is configured to enable coupling of operation power by the respective remotely controllable actuator to the at least one heater element of the respective object for heating the object in response to successfully performing a heating transaction initiated based on a request made by a user.

According to some embodiments, the control apparatus is configured: a) to initiate a commercial transaction upon receiving a request for a heating transaction from a user, and b) to determine that the heating transaction has been successfully performed upon receiving confirmation that the commercial transaction has been successfully performed.

According to some embodiments, the control apparatus is further configured to adjust at least one setting of heating determined by the heating transaction in response to receiving the respective adjustment of setting from a user device.

Said at least setting is selected from a group comprising: duration of heating, heating power, target temperature, activation of heating, deactivation of heating.

According to some embodiments of the system, the object is further provided with a manually controllable safety off-switch configured to immediately stop feeding of power to the at least one heating element of the object.

According to some embodiments of the system, the object is further provided with or associated with a presence detecting sensor, and the control apparatus is further configured to stop or interrupt heating determined by the heating transaction, if no presence of a person is detected.

According to some embodiments, a computer readable medium having stored thereon instructions which when executed by a processor of a control apparatus perform the steps of: i) receiving from a user device a request for a heating transaction concerning heating to be performed by one or more heater elements integrated into the object, wherein the request comprises at least a first identifier of the object; ii) optionally, determining a price for the heating transaction and initiating a commercial or non-commercial transaction; and iii) upon receiving confirmation of a successful performance of the commercial or non-commercial transaction or, if there is no price set to the heating transaction, in response to receiving the request for the heating transaction, confirming to the user device a successful heating transaction that enables heating determined by the heating transaction for a determined period by the one or more heater elements.

According to some embodiments, a computer readable medium having stored thereon instructions which when executed by a processor of a user device perform the steps of: i) obtaining a first identifier of the object; ii) sending, from the user device, a request for a heating transaction concerning heating to be performed by one or more heater elements integrated into the identified object, wherein the request comprises at least the first identifier of the object; iii) if the heating transaction is associated with a price, performing a commercial or non-commercial transaction with help of the user device; and iv) upon confirmation of a successful performance of the commercial or non-commercial transaction or, if there is no price set to the heating transaction, in response to sending the request for the heating transaction, receiving confirmation that commencing heating determined by the heating transaction is enabled for a determined period.

According to some embodiments, a computer program product is provided, having instructions when executed by user device cause the user device to perform a method comprising steps i) obtaining a first identifier of the object; ii) sending, from the user device, a request for a heating transaction concerning heating to be performed by one or more heater elements integrated into the identified object, wherein the request comprises at least the first identifier of the object; iii) if the heating transaction is associated with a price, performing a commercial or non-commercial transaction with help of the user device; and iv) upon confirmation of a successful performance of the commercial or non-commercial transaction or, if there is no price set to the heating transaction, in response to sending the request for the heating transaction, receiving confirmation that commencing heating determined by the heating transaction is enabled for a determined period.

According to some embodiments, a computer program product is provided, having instructions when executed by computing device or system cause the computing device or system to perform the steps of: i) receiving from a user device a request for a heating transaction concerning heating to be performed by one or more heater elements integrated into the object, wherein the request comprises at least a first identifier of the object; ii) optionally, determining a price for the heating transaction and initiating a commercial or non-commercial transaction; and iii) upon receiving confirmation of a successful performance of the commercial or non-commercial transaction or, if there is no price set to the heating transaction, in response to receiving the request for the heating transaction, confirming to the user device a successful heating transaction that enables heating determined by the heating transaction for a determined period by the one or more heater elements.

Providing comfort heat to users per request has an advantage that it enhances user experience and involves several potential health benefits, especially if operated in a particularly cool environment. By associating a transaction cost with the heating action, any cost of heating, in particular energy used thereto, may be allocated to individual users rather than the venue owner. Advanced controlling of heating also saves energy because activation of heating may be limited to situations when the respective individually identifiable object is in use and actually needed by the user. Data collected from transactions and on-demand heating provides facility operator information on comfort levels of users, which information the operator can begin to proactively utilize to improve user experience of its users, for example by optimizing default power levels of heater elements.

BRIEF DESCRIPTION OF THE DRAWINGS

In the following the invention will be described in greater detail, in connection with preferred embodiments, with reference to the attached drawings, in which.

DETAILED DESCRIPTION

Figure 1:
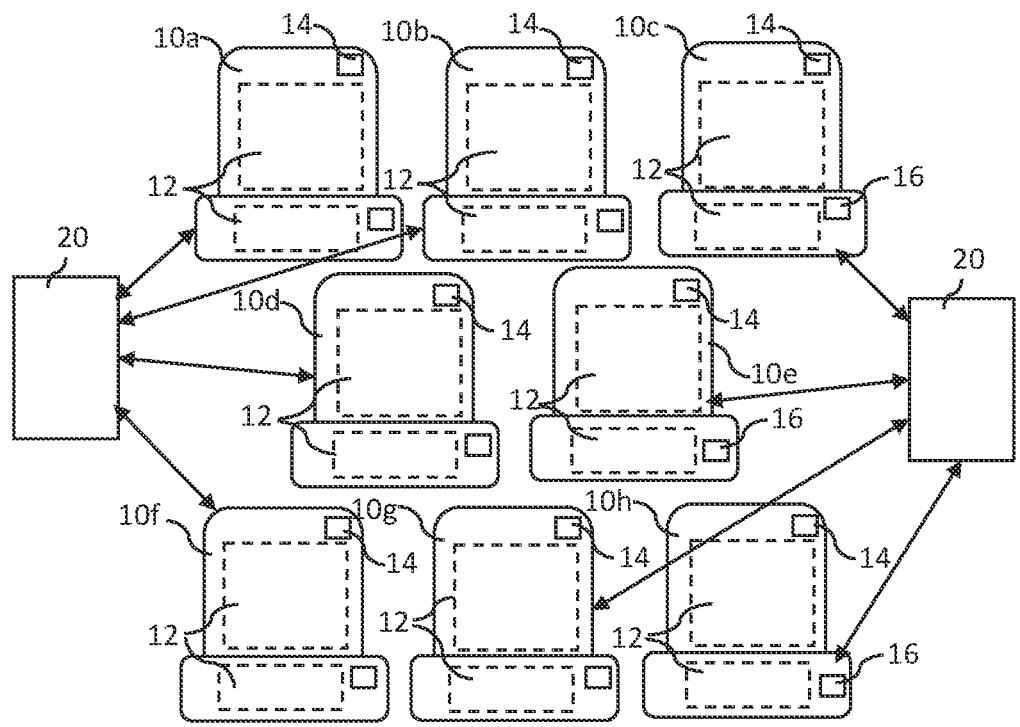
FIG. 1 illustrates a number of identifiable objects at a public venue or public space and a control apparatus.

FIG. 1 illustrates a plurality of identifiable objects 10, shortly referred to as objects 10, at a public venue or a public space and control apparatuses 20 operatively associated with objects 10. In this example objects 10 are seats 10a, . . . , 10h. Each seat is provided with one or more heater elements 12. In this example there are two heater elements 12 in each seat, one in the seat itself and one in the backrest, but any number of heater elements 12 is applicable. In this example, each object 10, i.e. a seat at the venue, also comprises at least one identification 14, which individually identifies the object and/or the heater element provided therein. If heater element is not as such identified, identification 14 of the identifiable object is preferably associated with at least one heater element provided therein. Such association may be stored at any suitable memory operably connected to one or more elements of the heating transaction system. Objects may further comprise one or more sensors 16 operatively connected with a control apparatus 20.

Seats in a public venue or public space are typically numbered individually, so that each member of the audience, referred herein as users, has a reservation for a specified seat for a specific event occurring at a predefined period of time. In such cases, it may be sufficient to identify the object 10 is that the position of the reserved seat at the venue is known. For example, position may be determined based on a section, a row number and a seat number, or any equivalent identification.

On the other hand, seats on a bus or train do not have to be pre-reserved, and a seat in a public park or at a bus stop or like, typically cannot be reserved in advance. For enabling heating of an individual object at the public venue or public space it is necessary that it is individually identifiable in one way or another.

Identification of the identifiable object 10, referred in short as the object 10, can be implemented by at least one tag attached to the object. The at least one tag may carry human readable identification of the identifiable object 10, for example a string of characters that can be manually read and copied by a user, and/or the at least one tag may carry machine readable identification, such as a barcode, QR-code or like readable using a camera of a mobile communication device, and/or the at least one tag may be an electronic identifier, that can be read for example using a near field communication (NFC) and/or radio frequency identification (RFID) capable mobile communication device. If electronically readable identifiers are used, these should be clearly associated with a single identifiable object. Therefore, NFC type tag with very short range is preferred for providing the identifier over tags that have a longer range to avoid confusion between adjacent objects if objects are very close to each other. RFID tags are a feasible option when distance between any adjacent objects exceeds the operation range of the RFID tags.

At least one control apparatus 20 is associated with the plurality of objects 10 is configured to enable and disable heating by the heater elements 12 separately for each object 10.

The control apparatus 20 comprises hardware and software that enables operation thereof as determined. The control apparatus may comprise one or more generic type of processors in operative connection with heating elements 10. According to some embodiments, the control apparatus 20 is an IoT controller, which enables communication and coordination between actuators and sensors of each object 10 and provides a centralized point of control for managing and optimizing performance of connected actuators and sensors. In this context, actuators refer to any remote controllable actuators, including but not limited to switches, relays, thermostats, and/or circuit breakers, which can be used to control power feed to and/or operation of the heater elements 12.

When the system is implemented as IoT system, the control apparatus 20 provides a bridge between actuators and sensors and the data communication network 23. As known in the art, the control apparatus 20 may be hardware-based or software-based. A hardware-based control apparatus 20 may be a small, low-power device that connects to the data communication network such as the Internet using wireless protocols, such as Wi-Fi, Bluetooth and Zigbee or wireline connections, such as Ethernet. A software-based control apparatus is deployed in the cloud, relying on application programming interfaces (APIs) and other web services to interact with connected actuator and sensors.

Heating elements 12 in the objects 10 may be implemented using heater pixels disclosed in U.S. patent application Ser. No. 18/194,626.

Figure 2:
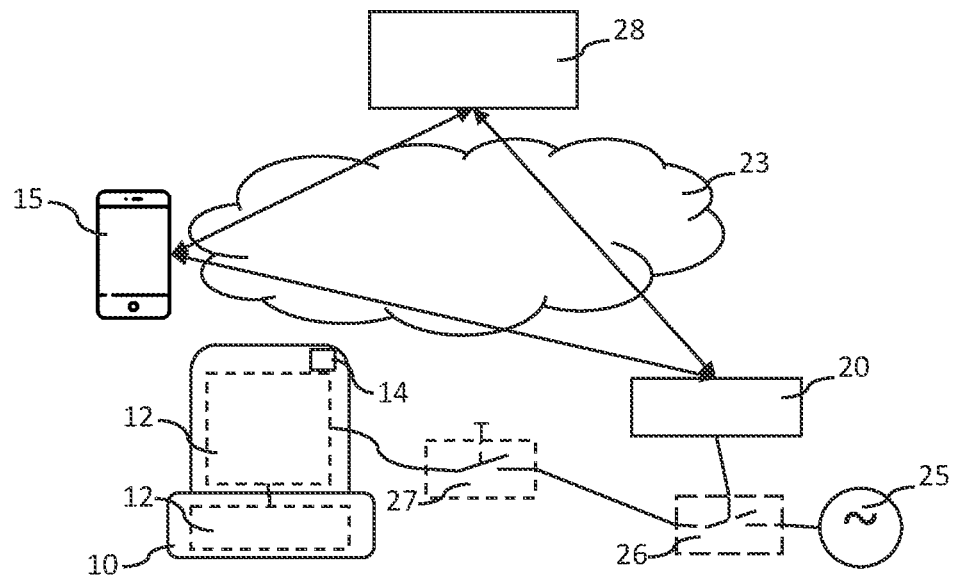
FIG. 2 illustrates elements of a system for controlling heating of an object.

FIG. 2 illustrates elements of a system for controlling heating of an identifiable object 10 according to some embodiments, in which activation of heater elements 12 of the identifiable object 10 is controlled through a digital on-line transaction. The transaction may be a standard transaction or it may be a microtransaction. The transaction may be a commercial one, i.e. a commercial transaction or a commercial microtransaction, in which case the user pays for the heating service, or the transaction may be non-commercial so that no payment is required to activate heating of the object 10 even though the transaction involves identifying a particular object 10 to be heated and the transaction occurs digitally on-line. In such a case, the heating transaction may be deemed successful in response to receiving a request for the heating transaction, as long as the request comprises all required information. The digital on-line transaction is preferably performed using a mobile application running on any user device 15 or a website accessed with a browser provided in the user device 15 or in any suitable computer device available to the user. The user device 15 may be a mobile device or a general use computer.

For determining, which object the transaction concerns, the user provides the system with an identification of the object 10. The object 10 can be identified by visually detecting the identifier 14 and feeding it to the mobile application or an appropriate field provided by a website accessed with a browser or reading the identifier 14 using for example camera of the user device 15 or an RF reader such as an NFC reader of the user device 15. According to some embodiments, geographic location of the user device 15 with respect to geographic location of the object 10 may be used for initiating a transaction, when identity of the object 10 can be determined reliable based on correlation of geographic location of the identifiable object 10 and determined position of the user device 15. In such case, geographic location of the object 10 may be considered as being an identification of the object 10. For using geographic location, this should be sufficiently accurately determined to avoid confusion between different objects 10. Geographic location may be used for example for identifying or suggesting identification of objects 10 that are geographically remote from each other, like bus stops or benches in a park, so that there is no possibility of confusion of identities of nearby objects. The minimum distance between objects to be identified based on their geographical location depends on accuracy of available positioning technologies.

The user device 15 communicates over a data communication network 23 with the control apparatus 20 and/or with one or more transaction services 28. At least one transaction service 28 facilitates association of heating transactions with a price to be paid by the user but may be omitted if the heating transaction is provided for users for free, in which case operation of the heating transaction system may be controlled by one or more control apparatuses 20 or by a commercial transaction service 28 without requiring a payment to be performed thereby.

The control apparatus 20 comprises software or a combination of hardware and software that enables operation thereof as determined herein. The control apparatus may comprise one or more processors and memories as well as inputs and output for receiving data from and/or controlling operation of functional hardware elements of the system, such as actuators like switches, sensors and/or thermostats. The control apparatus 20 is in data communication connection with one or more user devices 15 and, when applicable, one or more transaction services 28. Data communication connection may be provided for example over the Internet. One or more software-implemented functionalities of the control apparatus 20 may be provided as cloud computing services, in which case these are run on a cloud computing platform. According to some embodiments, all functionalities of the control apparatus 20 are implemented as software, and the software is used for remotely controlling any remotely controllable hardware involved for the heating operation, such as actuators 26, such as switches, thermostats or like.

Each object 10 may comprise or be associated with a respective control apparatus 20, or a single control apparatus 20 may be configured to control a plurality of objects 10 and heater elements 12 thereof. The control apparatus 20 may be configured to interact with the user device 15 directly or indirectly, by means of the mobile application or website accessed with a browser of the user device 15. For example, the mobile application or website may provide a user interface over which the user can adjust heating temperature and/or heating power before or during performing the heating determined by the heating transaction. As known to a skilled person, the mobile application or the website may be implemented in various ways, and the user device 15 may be operatively connected to any applicable element or module of the system, such as the control apparatus 20 and/or the transaction service 28, to give some examples.

According to some embodiments, the control apparatus 20 controls an actuator 26, such as a switch for enabling and disabling heating by connecting and/or disconnecting a power source 25 towards one or more heater elements 12. According to some embodiments, the control apparatus 20 is further configured to control or enable controlling of input power provided towards the heater elements for adjusting temperature thereof. Any suitable electrical circuitry and/or programmatic arrangement to adjust amount of electrical power to the heater elements 12 is applicable. Temperature can be adjusted for example by means of an adjustable resistor, or temperature can be adjusted by suitably switching power on and off.

The object 10 may comprise one or more temperature sensors (not shown) operatively connected to the control apparatus 20 for providing temperature data at least during an ongoing heating determined by the heating transaction. According to some embodiments, the control apparatus 20 controls a thermostat (not shown) associated with the object 10 for actively adjusting temperature of the object 10 and/or heater elements 12 thereof. According to some embodiments, the user may determine a desired temperature and/or see currently detected temperature of the object 10 and/or heater elements 12 using the mobile application or website that is operatively connected with the control apparatus 20 for providing information on the desired temperature.

Some operations of the control apparatus 20 and/or a plurality of control apparatuses 20 associated with different objects 10 are preferably remotely controlled. According to some embodiments, a transaction service 28 communicates with the one or more control apparatuses 20 and the user device 15, for initiating and performing commercial or non-commercial transactions and providing information on successfully completed commercial or non-commercial transactions concerning any individual object 10 controlled by the respective control apparatus 20.

According to some embodiments, the heating transaction is free of charge, and no commercial transaction is required. A free transaction may be controlled by a transaction service 28 or the one or more control apparatuses 20 may be configured to determine themselves whether a heating transaction has been properly performed so that the control apparatus 20 can safely enable activating of heating determined by the heating transaction by means of the one or more respective heater elements 12.

According to some embodiments, the transaction service 28 is a commercial transaction service configured to accept online payments for heating transactions. The transaction service 28 may be implemented using any known transaction service.

When requesting the heating transaction, and/or during heating determined by the heating transaction, the user may further determine settings for the respective heating, such as timing, duration, intensity of heating and/or desired temperature to adjust heating to his/her own needs and preferences. The mobile application or website may further allow on-line adjustment of heating settings while the heating is already active, for example by increasing or decreasing heating power/temperature.

A commercial cost can be applied to the period of heating and/or to energy consumed. This transaction can be directly paid for by the user on the spot, or the cost of usage can be incorporated into a customer invoice through other means. For example, when the user reserves a seat at a venue for a particular event, heating of the reserved seat during the event may be offered as an additional service to be included in the specific ticket reservation and paid in advance along with the event ticket using any known commercial transaction service. Information on the performed, successful heating transaction is provided to the control unit 20.

The venue operator or other object owner may limit use of heating, for example number of active heater elements or number of simultaneous heating sessions determined by a plurality of heating transactions in the system, to ensure sufficiency of limited energy supply and/or to limit heating induced costs. A limit may be set to the total maximum power consumed by all active heater elements. When heating transactions are requested on-line, the system may determine whether there is sufficient capacity available before enabling further heating transactions before it enables a new heating transaction to be requested. If a capacity limit has been reached, control apparatus 20 may refuse any new heating transactions. If the heating transaction is pre-purchased, for example along with purchasing a ticket to an event, the ticketing system may enable purchasing of a predefined maximum number of heating transactions per event to avoid overbooking.

According to some embodiments, energy consumption of a group of heater elements may be controlled by applying an intermittent activation pattern, in other words pulse width modulation (PWM) thereto: each heater element in the group of heater elements is active over a predetermined period and then inactive over another predetermined period. This enables limiting maximum power consumed by the group of heater elements at any time by altering between active and inactive periods of different heater elements in the group of heater elements.

In case the heating transaction was pre-purchased, the control apparatus 20 preferably requires further identification of the object 10 at the venue before heating determined by the heating transaction is enabled. This is to avoid erroneous activation of heating, for example if the user would choose a different seat than what was initially assigned to him/her. Identification may be performed for example by manually entering a second identity of the object as seen on spot via a user interface (application or website) or by electronically reading a tag that provides a second identifier on the object 10. If the second identity of the identified object 10 does not match with first identity associated with the pre-purchased transaction, heating transaction may be refused or the pre-purchased heating transaction may be re-associated with the newly provided second identity. For security reasons, it may be preferable that the first identity and the second identity are different, so that at least one of these is only available at the object. A plurality of different identities associated with any individual object 10 may be stored in the control apparatus 20 or in a data storage accessible by the control apparatus 20 so that it can determine whether any two or more received identities are associated with the same object 10.

The object may comprise a safety off-switch 27 operatively connected to one or more heater elements 12 of the object 10. The safety off-switch 27 may be a physical, manually operable switch provided on the object 10. The safety off-switch 27 enables the user to quickly shut off heating for any health, comfort, and/or security reason. Such reasons could be for example, that the user perceives the temperature of the object becoming uncomfortable, or that the heating has been activated unwillingly to the user, for example by someone else. If use of heating is paid by usage time, switching off heating using the safety off-switch 27 may be detected by the system to pause or stop calculation of usage time to avoid charging for heating service that is not used. This may be perceived by the users as a fair practice.

Figure 3:
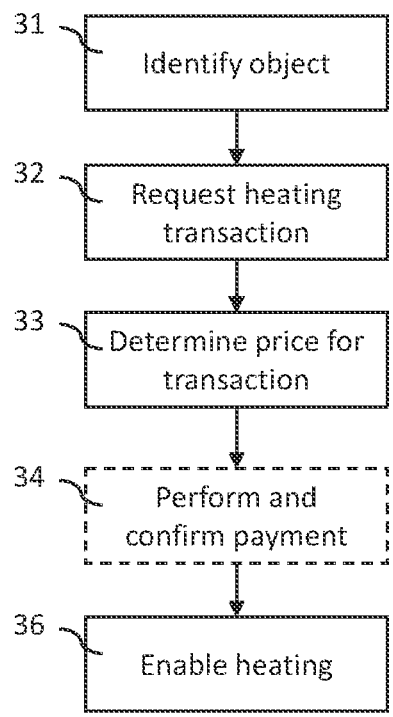
FIG. 3 Illustrates a method according to some embodiments.

FIG. 3 Illustrates a method according to some embodiments. In this embodiment, heating transaction is initiated based on an on-line request at the spot.

In step 31, the user identifies the object to be heated for the heating system by feeding a code associated with the object into the mobile application or website or by electronically reading a tag or other applicable identifier provided in or on the object. For security reasons, the system may even require a combination of different identifications to ensure that identity of the object provided by the user is correct. For example, both a manually submitted code and reading of a tag may be required.

In step 32, the user requests a heating transaction for the identified object. The request may include determining parameters for the heating transaction. Such parameters may comprise for example duration and/or intensity and/or desired temperature. Preferably, a heating transaction related to a specific object has default settings, but optionally the user may be provided with capability to adjust parameters for example using a user interface provided by the mobile application or website.

In step 33, a price for the heating transaction is determined. Price may depend on one or more parameters of the requested heating transaction, but a fixed price may be applicable as well.

In the optional step 34, a commercial transaction is performed to receive a payment from the user. Any on-line payment transaction known in the art is applicable. The payment is optional, i.e., the heating transaction may also be determined to be free of charge, which is indicated by dashed box 34. According to some embodiments, it may be determined that heating transaction does not involve a price, in which case the commercial transaction can be omitted. In step 36, the heating transaction is deemed successfully performed and heating determined by the heating transaction is enabled. Heating determined by the heating transaction may be enabled immediately, or at a predefined point in time. Preferably, heating determined by the heating transaction has a predefined duration. The enabling of the heating is preferably controlled by the control apparatus. For example, the control apparatus controls at least one actuator 26 associated with the respective object for coupling the one or more heater elements integrated into the respective object to an electrical power source 25. The actuator 26 may be remotely controllable. According to some embodiments, actuator 26 is a remotely controllable actuator that operates a switch, as illustrated in FIG. 2. If the heating transaction was requested to start immediately, heating can commence right after receiving confirmation of successful commercial transaction in step 34.

The object 10 may also be provided with a presence detecting sensor for detecting whether a user actually occupies the object or not. If no presence of a user is detected, heating may be automatically inactivated at any time, either temporarily or for good. Presence of a user may be detected using any known presence detecting sensors, in other words sensors capable of detecting presence of a person, such as proximity sensors, temperature sensors, motion sensors pressure sensors, occupancy sensors and/or infrared sensors.

Figure 4:
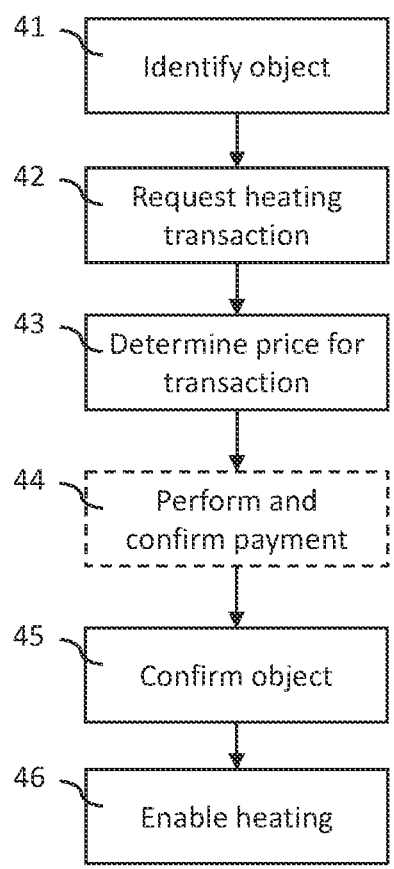
FIG. 4 Illustrates a method according to some embodiments.

FIG. 4 Illustrates a method according to some embodiments. In this embodiment, heating transaction is ordered and paid in advance, but heating is only enabled during a scheduled event and commenced upon arrival of the user at the spot.

In step 41, the user makes an advance reservation for an object to be heated. Advance reservation assigns the object (i.e. a specific seat) to the user for a specific event, which occurs during a predetermined period, which may be determined for example by its start time and a duration or end time. At this phase, the object may be identified for example by means of a seat reservation system, which identifies for example a section, row, and seat on the row. This object information may be associated in the heat transaction system and/or in the control apparatus with identity of a specific object 10.

In step 42, the user requests a heating transaction for the object that was reserved for the respective event. The request may include parameters for the heating transaction. Parameters determined or requested by the user may determine, for example, duration and/or intensity and/or desired temperature, depending on control capabilities provided by the heating transaction system. Since the heating transaction occurs in the future, parameters of the heating transaction preferably also determine at least an earliest possible starting time of heating determined by the heating transaction, or a period of time during which the heating is enabled.

In the step 43, a price for the heating transaction is determined, if any. Price may depend on one or more characteristics of the requested heating transaction, but a fixed price may be applicable as well.

In optional step 44, a commercial transaction process is performed to receive a payment from the user. Any on-line payment transaction method known in the art is applicable, and payment of the heating transaction may be performed as a lump sum together with the seat reservation. Upon determining that the commercial transaction has been successful, information thereof is received by the transaction system 28 and/or, if control apparatuses 20 are themselves responsible for controlling heat transactions, by the respective control apparatus 20. The payment is optional, i.e., the heating transaction may also be determined to be free of charge, which is indicated by dashed box 44. Information on successful commercial transaction may be determined as a status information of the heat transaction, which may be a parameter value, a flag or a label comprised in the heat transaction information stored in any applicable element of the heat transaction system.

In step 45, the user arrives at the venue. For security reasons, the transaction system 28 may require further identification of the object 10 to confirm the heating transaction before heating determined by the heating transaction can be commenced. A combination of at least two different identifications ensures that identity of the object initially reserved and identity of the object on which heating is activated refer to the same object. For example, the system may require the user to use a camera or a NFC reader of the user device to read a tag on the object, or to enter a code provided on the object in the mobile application or website, thus providing a second identifier of the object. The second identifier is compared to the first identifier to confirm that these refer to the same object. If the first identity of the object 10 and the second identity do not refer to the same object, the system may either refuse commencing heating determined by the heating transaction or reassign the heating transaction to a new object, namely the object that was identified by the second identifier provided by the tag or code provided on the object.

In step 46, upon receiving confirmation that the user is at the identified object, transaction is deemed successfully performed and heating transaction can be enabled and heating can be commenced. Heating is enabled by the control apparatus. For example, the control apparatus may control at least one actuator 26, such as a switch, to couple the one or more heater elements to an electrical power source 25.

The object 10 may also be provided with or associated with a presence detecting sensor that detects whether a user occupies the object or not. If no presence of a user is detected, heating may be automatically inactivated, either temporarily so that heating can be restarted as soon as presence of the user is detected again, as long as the period determined by the heating transaction is still ongoing, or heating may be automatically inactivated for good, especially if no presence of the user is detected and the period for which the heating was requested is about to expire to avoid wasting energy on heating an empty object.

If the heating transaction was requested for a future period, the heating transaction has preferably a determined starting time and duration, and the control apparatus controls the at least one actuator to switch off power feeding to the heater elements 12 at the end of the predetermined duration of the heating transaction.

One proposed model is the activation of the heating through a digital on-line commercial (or non-commercial) transaction, whereby the user activates the heating in their desired location through e.g. a mobile app or mobile browser. The user identifies the object of heating by feeding a code into the app or browser (e.g. seat number), or electronically reads (e.g. optically or via RF) a tag or other identifier on the object, (or a form of uses a location tracking), or for security reasons a combination of these. The user and/or purchaser, if not the same person, may at the start or during the usage of the heater further define the duration and intensity of the warming to adjust to the users' specific needs and preferences. To control and limit the usage of the heating and total energy consumer, a commercial transaction cost is applied to the usage. This transaction can be directly paid by the user on the spot, or the cost of usage can be incorporated into the customer invoice through other means.

Figure 5:
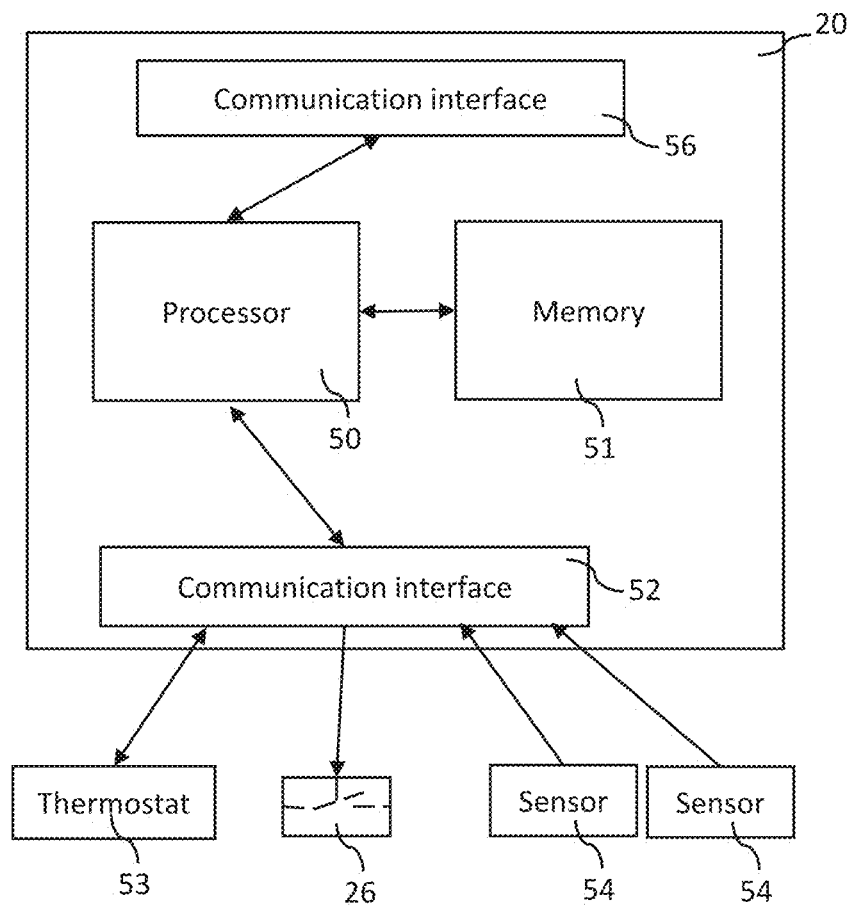
FIG. 5 illustrates a control apparatus according to some embodiments.

FIG. 5 illustrates a control apparatus 20 according to some embodiments. The control apparatus comprises at least one processor 50 and at least one memory 51 operably coupled with the processor. The control apparatus also comprises one or more first communication interfaces 52 for providing communication connection with at least one actuator 26 for controlling power feeding to one or more heater elements of at least one object. The at least one first communication interface may further provide a communication connection with further devices, such thermostats 53 and with one or more sensors 54, such as presence detecting sensors and/or temperature sensors. Depending on requirements and roles of respective devices 26, 53, 54 in the system, each communication connection may be arranged as one-way or two-way communication. The control apparatus 20 further comprises a second communication interface 56 for providing a communication connection over a data communication network with at least one transaction service and/or at least one user device. The first and the second communication interface may provide communication for example using data communication network such as the Internet using wireless protocols, such as 2G, 3G, 4G or 5G cellular communication, Wi-Fi, Bluetooth and Zigbee or wireline connections, such as Ethernet. According to some embodiments, the first communication interface may be implemented using an analog or digital electrical I/O connection between the at least one processor 50 and applied actuators and/or sensors, in which case separate, dedicated communication interface circuitry is not necessary.

Systems and methods described herein may be embodied in a computer program or a plurality of computer programs, which may exist in a variety of forms both active and inactive in a single computer system or across multiple computer systems. For example, they may exist as software program(s) comprising program instruction sin source code, object code, executable code or other formats for performing some of the steps. Any of the above may be embodied on a computer readable medium, which includes storage devices, in compressed or uncompressed form.

The term computer refers to any electronic device comprising a processor, such as a general-purpose central processing unit (CPU), a specific purpose processor or a microcontroller. A computer is capable of receiving data (an input), of performing a sequence of predetermined operations thereupon, and of producing thereby a result in the form of information or signals (an output). Depending on context the term computer will mean either a processor in particular or can refer more generally to a processor in association with an assemblage of interrelated elements contained within a single case or housing.

A mobile device can be any type of portable device, including a cellular telephone, a Personal Digital Assistant, a smartphone, a tablet etc. The mobile device comprises a user interface comprising a display and input capability, which may be provided for example by a touch sensitive display or separate keyboard. The mobile device may comprise a camera, and various input and output components.

A computer readable medium can be any means that can contain or store the program for use by or in connection with the instruction execution system, apparatus, or device. The computer readable medium can be, for example but not limited to, an electronic, magnetic, optical, electromagnetic or semiconductor system, apparatus or device.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A method of providing heating by a heatable object available for use by a user who is a member of public, the method comprising:

receiving from a user device a request for a heating transaction concerning heating to be performed by one or more resistive heater elements integrated into one of a plurality of heatable objects, wherein the request comprises at least a first identifier of the heatable object obtained by reading, by the user device, an optically detectable tag or an electronic tag provided at the heatable object, or obtained as a string of characters provided as a visually readable code provided at the heatable object that is input by the user via a user interface of the user device, wherein the request is received by a control apparatus configured to control a plurality of remotely controllable actuators each configured to control provision of operation power to a respective at least one heater element integrated into the respective heatable object, and wherein each remotely controllable actuator is configured to control provision of operation power to the respective at least one heater element integrated into the respective heatable object;

optionally, determining a price for the heating transaction and initiating a commercial transaction;

upon receiving confirmation of a successful performance of the commercial transaction or, if there is no price set to the heating transaction, in response to receiving the request for the heating transaction, confirming to the user device a successful heating transaction that enables heating determined by the heating transaction for a determined period by the one or more resistive heater elements; and commencing the heating determined by the heating transaction by means of the one or more resistive heater elements of the heatable object identified by the first identifier.

2. The method according to claim 1, further comprising:
requesting the user to provide a second identifier of the heatable object by means of a user device,
receiving, by the control apparatus, the second identifier of the heatable object from the user device,
comparing, by the control apparatus, the second identifier of the heatable object to the first identifier,
if the second identifier of the heatable object and the first identifier of the heatable object are determined to refer to the same heatable object, enabling commencing the heating determined by the heating transaction by at least one resistive heater element integrated into the heatable object.

3. The method according to claim 1, further comprising:
receiving, by means of a user interface provided by the user device, at least one setting concerning the heating transaction, wherein the at least one setting is selected from a group comprising: duration of heating, heating power, target temperature, activation of heating, deactivation of heating, and
controlling heating determined by the heating transaction based on said at least one setting.

4. The method according to claim 1, wherein the method further comprises controlling, by the control apparatus, operation of a plurality of resistive heater elements of the plurality of heatable objects enabled by a plurality of heating transactions to maintain instantaneous total power consumption by the plurality of resistive heater elements below a predetermined limit value.

5. A method for providing heating by a heatable object available for use by a user who is a member of public, the method comprising:
obtaining, by a user device, a first identifier of the heatable object by reading an optically detectable tag or an electronic tag provided at the heatable object, or by receiving a string of characters provided as a visually readable code at the heatable object as user input via a user interface of the user device;
sending, from the user device, a request for a heating transaction concerning heating to be performed by one or more resistive heater elements integrated into the identified heatable object, wherein the request comprises at least the first identifier of the heatable object, wherein the user device sends the request to a control apparatus configured to control a plurality of remotely controllable actuators each configured to control provision of operation power to a respective at least one heater element integrated into the respective heatable object, and wherein each remotely controllable actuator is configured to control provision of operation power to the respective at least one heater element integrated into the respective heatable object;

if the heating transaction is associated with a price, performing a commercial transaction with help of the user device; and upon confirmation of a successful performance of the commercial transaction or, if there is no price set to the heating transaction, in response to sending the request for the heating transaction, receiving confirmation that commencing heating determined by the heating transaction is enabled for a determined period, wherein the heating is performed by means of the one or more resistive heater elements.

6. The method according to claim 5, further comprising:
receiving, by the user device, a request for providing a second identifier of the heatable object,
obtaining the second identifier by the user device, wherein the second identifier is provided at the heatable object,
sending, from the user device, the second identifier of the heatable object for comparing the second identifier of the heatable object to the first identifier of the heatable object, and
in response to sending the second identifier of the heatable object, receiving confirmation that commencing heating determined by the heating transaction is enabled by the one or more resistive heater elements of the heatable object associated with the first and second identifiers for a determined period, if the second identifier of the heatable object and the first identifier of the heatable object can be determined to refer to the same heatable object.

7. The method according to claim 5, wherein the first identifier and/or a second identifier of the heatable object are obtained by the user device by one or more of:
obtaining the first identifier of the heatable object or the second identifier of the heatable object using a code reader comprised or operationally coupled with the user device, when the identifier of the heatable object is provided at the heatable object as an optically detectable tag, such as a bar code or a QR-code, and/or
obtaining the first identifier of the heatable object or the second identifier of the heatable object using an electronic tag reader comprised or operationally coupled with the user device, wherein the first identifier of the heatable object or the second identifier of the heatable object is provided at the of the heatable object as an electronically readable tag, such as an NFC-tag, or an RFID-tag,
receiving the first identifier of the heatable object or the second identifier of the heatable object as a string of characters typed in by the user in a user interface provided at the user device, wherein the first identifier of the heatable object or the second identifier of the heatable object is provided as a visually readable code provided on the heatable object,
obtaining geographic location of the user device, wherein the first identifier of the heatable object or the second identifier of the heatable object is determined on basis of selecting from a plurality of heatable objects the heatable object that is within a predetermined distance from the geographic location of the user device,
receiving the first identifier of the heatable object from a seat reservation system, wherein the first identifier of the heatable object identifies a seat reserved by the user.

8. The method according to claim 5, further comprising:
determining, by means of a user interface provided at the user device, at least one setting concerning the heating transaction, wherein the at least one setting is selected from a group comprising: duration of heating, heating power, target temperature, activation of heating, deactivation of heating.

9. The method according to claim 8, wherein said determining is performed upon requesting the heat transaction and/or upon commencing the heating determined by the heating transaction and/or during the ongoing heating determined by the heating transaction.

10. A system for providing heating by a heatable object available for use by a user who is a member of public, the system comprising:
   a plurality of of heatable objects, each heatable object comprising at least one resistive heater element integrated into the heatable object and at least one identifier of the heatable object provided as an optically detectable tag or an electronic tag provided at the heatable object, or as a string of characters provided as a visually readable code at the object,
   a plurality of remotely controllable actuators, wherein each remotely controllable actuator is configured to control provision of operation power to the respective at least one heater element integrated into the respective heatable object,
   a control apparatus configured to control the plurality of remotely controllable actuators, wherein the control apparatus is configured to enable coupling of operation power by the respective remotely controllable actuator to the at least one resistive heater element of the respective heatable object for heating the heatable object in response to successfully performing a heating transaction initiated based on a request for a heating transaction made by a user, wherein the request comprises at least a first identifier of the heatable object.

11. The system according to claim 10, wherein the control apparatus is configured:
   to initiate a commercial transaction upon receiving a request for a heating transaction from a user,
   to determine that the heating transaction has been successfully performed upon receiving confirmation that the commercial transaction has been successfully performed.

12. The system according to claim 10, wherein the control apparatus is further configured:
   to adjust at least one setting of heating determined by the heating transaction in response to receiving the respective adjustment of setting from a user device, wherein the at least setting is selected from a group comprising: duration of heating, heating power, target temperature, activation of heating, deactivation of heating.

13. The system according to claim 10, wherein the heatable object is further provided with a manually controllable safety off-switch configured to immediately stop feeding of power to the at least one resistive heating element of the heatable object.

14. The system according to claim 10, wherein the heatable object is further provided with or associated with a presence detecting sensor, and the control apparatus is further configured to stop or interrupt heating determined by the heating transaction, if no presence of a person is detected.

15. A non-transitory computer readable medium having stored thereon instructions which when executed by a processor of a control apparatus perform the steps of:
   receiving from a user device a request for a heating transaction concerning heating to be performed by one or more resistive heater elements integrated into a heatable object, wherein the request comprises at least a first identifier of the heatable object obtained by reading, by the user device, an optically detectable tag or an electronic tag provided at the heatable object, or obtained as a string of characters provided as a visually readable code at the heatable object that is input by the user via a user interface of the user device;
   optionally, determining a price for the heating transaction and initiating a commercial or non-commercial transaction; and
   upon receiving confirmation of a successful performance of the commercial or non-commercial transaction or, if there is no price set to the heating transaction, in response to receiving the request for the heating transaction, confirming to the user device a successful heating transaction that enables heating determined by the heating transaction for a determined period by the one or more resistive heater elements, wherein the control apparatus is configured to control a plurality of remotely controllable actuators each configured to control provision of operation power to a respective at least one heater element integrated into the respective heatable object, and wherein each remotely controllable actuator is configured to control provision of operation power to the respective at least one heater element integrated into the respective heatable object, and wherein each remotely controllable actuator is configured to control provision of operation power to the respective at least one heater element integrated into the respective heatable object.

16. A non-transitory computer readable medium having stored thereon instructions which when executed by a processor of a user device perform the steps of:
   obtaining a first identifier of a heatable object by reading an optically detectable tag or an electronic tag provided at the heatable object, or by receiving a string of characters provided as a visually readable code at the heatable object as user input via a user interface of the user device;
   sending, from the user device, a request for a heating transaction concerning heating to be performed by one or more resistive heater elements integrated into the heatable object identified by the first identifier, and wherein the request comprises at least the first identifier of the heatable object, wherein the user device sends the request to a control apparatus configured to control a plurality of remotely controllable actuators each configured to control provision of operation power to a respective at least one heater element integrated into the respective heatable object, and wherein each remotely controllable actuator is configured to control provision of operation power to the respective at least one heater element integrated into the respective heatable object;
   if the heating transaction is associated with a price, performing a commercial or non-commercial transaction with help of the user device; and
   upon confirmation of a successful performance of the commercial or non-commercial transaction or, if there is no price set to the heating transaction, in response to sending the request for the heating transaction, receiving confirmation that commencing heating determined by the heating transaction is enabled for a determined period by the one or more resistive heater elements.

* * * * *